Patented Feb. 4, 1930

1,745,851

UNITED STATES PATENT OFFICE

JOHN C. HAMILTON, OF MOUNTAIN LAKES, NEW JERSEY; BENJAMIN H. THURMAN, OF TUCKAHOE, NEW YORK; AND LOUIS G. COPES, OF BAYONNE, NEW JERSEY, ASSIGNORS, BY MESNE ASSIGNMENTS, TO BEST FOODS, INC., OF NEW YORK, N. Y., A CORPORATION OF NEW JERSEY

METHOD OF TREATING COD-LIVER OIL

No Drawing. Original application filed July 31, 1925, Serial No. 47,228. Divided and this application filed August 6, 1926. Serial No. 127,704.

Our invention relates specifically to a process of refining cod-liver oil for use in making nut margarine. It is known that nut margarine does not contain vitamins to any substantial degree and many efforts have been made heretofore to add vitamins to the margarine in a satisfactory manner so that a product having good flavor and stability will be produced. It is also known that one of the richest sources of vitamins is marine oil, such as cod-liver oil. The vitamins are present in the greatest quantity in cod-liver oil extracted from freshly caught fish.

The difficulty encountered heretofore in the addition of vitamins from cod-liver oil to nut margarine, has been that the resulting product is possessed at the beginning with a characteristic taste and odor of the cod-liver oil, and in many instances the cod-liver oil has had unpleasant effects upon the stomachs of those who ate the food product. We have discovered a method by which the cod-liver oil may be purified and added to the margarine without the bad effects above noted.

The method preferred by us is to treat the cod-liver oil so as to neutralize or otherwise remove those substances which cause the objectionable odor and taste by any suitable means.

A method which we have used to successfully refine the cod-liver oil is as follows:

The capacity of the tank used for the purpose is conveniently 40 gallons so that 40 gallons is the amount of oil used per batch.

The oil is brought to a temperature of about 70° F. A certain leeway is permissible. Care should be taken, however, to keep the oil below 80° F. and 70° F. is a convenient objective.

We preferably take about 10% by weight of 16° Bé. caustic soda and add it to the oil rapidly by vigorous agitation, the object being to combine the caustic soda with the oil as quickly as possible. The amount of caustic may be reduced to 7% to 8% when the fatty acid of the oil is less than 1%. The amount of caustic soda used varies directly as the fatty acid content. The object is to neutralize the fatty acid. This can be determined by the titration test for neutrality.

This agitation is continued for about 15 minutes. At the end of the 15-minute stirring period, the oil is heated slowly to about 120° F. This heating operation preferably requires about 20 minutes or longer. The oil is preferably agitated throughout the entire heating period, but the violence of the agitation is gradually reduced. These details are subject to revision on the part of the operator since the foots may attain a condition suitable for settling before the end of the 20 minute period or before the oil reaches 120° F. The oil should therefore be heated gently to about 120° F. and stirred slowly until the foots is in a suitable condition for settling at which time the stirring and heating can be stopped. In no case, however, should the oil be heated substantially above 120° F.

The oil is then allowed to settle for not less than 3 hours, preferably over night.

After settling, the oil is drawn off from the soap and transferred to another kettle and about .50% by weight of a clarifying agent or agents added and mixed with the oil thoroughly. We have successfully used .25% diatomaceous earth and .25% bleaching carbon as the clarifying agents.

Immediately after adding the clarifying agents, the oil is again heated to about 120° F., stirring is continued for 1 hour from the time of the addition of the clarifying agents. The oil is then filtered through a filter-press to clarify it. After the oil reaches 120° F. it is kept at this temperature until ready for filtering.

After filtering, the oil is allowed to cool to room temperature after which it is ready for percolation through any suitable apparatus. The apparatus above referred to consists in means for holding granular active carbon through which the oil is percolated, while at the same time a non-toxic, non-oxidizing gas, such as carbon-dioxide gas, is passed through the apparatus in a direction opposite to that of the oil.

While we prefer to use the preliminary refining step before percolating the oil, we would like to have it understood that this refining step is not always necessary, as the principal benefits of our invention may be secured by merely percolating the oil, as above described, and without using the preliminary refining step.

This is a division of our application Serial No. 47,228, filed July 31, 1925.

We claim:

1. The method of deodorizing cod-liver oil, which consists in passing the oil at substantially room temperature through a granular active carbon while passing a non-toxic and non-oxidizing gas through the oil.

2. The method of deodorizing cod-liver oil, which consists in passing the oil at substantially room temperature through a mass of active carbon while passing carbon-dioxide through the mass in opposite direction to that of the oil.

3. The method of deodorizing cod-liver oil, which consists in passing it at substantially room temperature through a mass of active granular carbon while passing carbon-dioxide through the mass in opposite direction to that of the oil.

4. The method of deodorizing cod-liver oil, which consists in agitating said oil with an alkali, settling and filtering the oil to remove the foots, then passing the oil at substantially room temperature through granular active carbon while simultaneously passing a non-toxic and non-oxidizing gas through the oil in opposite direction to the flow of the oil.

J. C. HAMILTON.
BENJAMIN H. THURMAN.
LOUIS G. COPES.